US012590271B2

(12) United States Patent
Jobe et al.

(10) Patent No.: US 12,590,271 B2
(45) Date of Patent: Mar. 31, 2026

(54) CLEANING COMPOSITIONS

(71) Applicant: Aspen Pumps Limited, Hailsham (GB)

(72) Inventors: Kajally Jobe, Hailsham (GB); Christopher John Gee, Hailsham (GB)

(73) Assignee: Aspen Pumps Limited, Hailsham (GB)

( * ) Notice: Subject to any disclaimer, the term of this patent is extended or adjusted under 35 U.S.C. 154(b) by 757 days.

(21) Appl. No.: 17/779,020

(22) PCT Filed: Nov. 30, 2020

(86) PCT No.: PCT/EP2020/083873
§ 371 (c)(1),
(2) Date: May 23, 2022

(87) PCT Pub. No.: WO2021/105496
PCT Pub. Date: Jun. 3, 2021

(65) Prior Publication Data

US 2023/0365895 A1 Nov. 16, 2023

(30) Foreign Application Priority Data

Nov. 28, 2019 (GB) ..................................... 1917380

(51) Int. Cl.

| | |
|---|---|
| ***C11D 3/20*** | (2006.01) |
| ***C11D 1/22*** | (2006.01) |
| ***C11D 1/62*** | (2006.01) |
| ***C11D 1/90*** | (2006.01) |
| ***C11D 3/04*** | (2006.01) |
| ***C11D 3/37*** | (2006.01) |
| ***C11D 3/43*** | (2006.01) |

(52) U.S. Cl.
CPC .............. *C11D 3/2082* (2013.01); *C11D 1/22* (2013.01); *C11D 1/62* (2013.01); *C11D 1/90* (2013.01); *C11D 3/042* (2013.01); *C11D 3/2068* (2013.01); *C11D 3/2075* (2013.01); *C11D 3/3726* (2013.01); *C11D 3/3757* (2013.01); *C11D 3/3765* (2013.01); *C11D 3/43* (2013.01)

(58) Field of Classification Search
CPC .... C11D 1/22; C11D 1/62; C11D 1/90; C11D 3/2075; C11D 3/2068; C11D 3/2082; C11D 3/3726; C11D 3/3757; C11D 3/042
USPC ....... 510/191, 235, 238, 475, 477, 488, 505, 510/506
See application file for complete search history.

(56) References Cited

U.S. PATENT DOCUMENTS

| | | | | |
|---|---|---|---|---|
| 4,743,395 A | 5/1988 | Leifheit | | |
| 5,707,952 A | 1/1998 | Lambremont et al. | | |
| 7,338,564 B2 | 3/2008 | Garner et al. | | |
| 9,404,069 B1 | 8/2016 | Kane et al. | | |
| 2011/0269659 A2* | 11/2011 | Chapman ................. | C11D 1/04 510/191 | |
| 2017/0175036 A1* | 6/2017 | Cermenati ............... | C11D 1/62 | |
| 2017/0335254 A1* | 11/2017 | Man ........................ | B08B 1/143 | |

FOREIGN PATENT DOCUMENTS

| | | | |
|---|---|---|---|
| EP | 0636170 B1 | 8/1997 | |
| EP | 2336282 A1 * | 6/2011 | ........... C11D 3/2075 |
| EP | 3118300 A1 * | 1/2017 | ............. C11D 1/002 |
| EP | 3184620 A1 * | 6/2017 | ............. B08B 1/006 |
| EP | 3228688 A1 * | 10/2017 | ......... C11D 11/0023 |
| GB | 2393909 | 4/2014 | |
| WO | 9745510 | 12/1997 | |
| WO | WO-9745510 A1 * | 12/1997 | ............. A61K 8/604 |
| WO | WO-9928427 A1 * | 6/1999 | ............... C11D 3/16 |
| WO | WO-2009112794 A1 * | 9/2009 | ............... C11D 1/44 |
| WO | 2013078783 | 6/2013 | |
| WO | 2014092733 | 6/2014 | |
| WO | 2016023145 | 2/2016 | |
| WO | 2018222410 | 12/2018 | |

OTHER PUBLICATIONS

European Search Report for corresponding EP Application No. 20816960.7, dated Jan. 30, 2024, 10 pages.
Combined Search and Exam Report for corresponding Application No. GB1917380.6 dated May 19, 2020, 8 pages.
International Search Report for corresponding Application No. PCT/EP2020/083873 dated Jun. 15, 2021, 6 pages.

* cited by examiner

*Primary Examiner* — Gregory R Delcotto
(74) *Attorney, Agent, or Firm* — Taft, Stettinius & Hollister LLP

(57) ABSTRACT

The present invention relates to cleaning compositions, in particular to cleaning compositions for use in heating, ventilation and air-conditioning (HVAC) installations. We describe an acidic cleaning composition concentrate comprising: at least one acid having a $pKa_1$ of 4 or less, wherein the at least one acid is at least one organic acid and/or non-oxidising mineral acid; a rheology modifier, and a polar protic solvent. In some examples, compositions may also include at least one of one or more weak nitrogenous bases, one or more carboxylate salts and one or more surfactants.

17 Claims, No Drawings

CLEANING COMPOSITIONS

CROSS REFERENCE TO RELATED APPLICATIONS

This is a U.S. National Stage Application of, and claims priority to, PCT/EP2020/083873, filed Nov. 30, 2020, which further claims priority to UK patent application s/n GB1917380.6, filed Nov. 28, 2019, the contents of each is incorporated herein by reference in its entirety.

The present invention relates to cleaning compositions, in particular to gelled cleaning compositions for use in heating, ventilation and air-conditioning (HVAC) installations.

Physical examination of heat exchange surfaces in condensers and evaporators undergoing natural soiling suggests that soil matter accumulates in up to three distinct layers.

a. The loose layer-A top surface layer of dirt that can be readily removed by rain. The depth of the loose layer fluctuates with rain patterns. This third layer constitutes a settling of loose soil matter, accumulating in dry periods and being removed during rainy periods.
b. The physical layer-A secondary surface layer of soil that is resistant to removal by rain but can be readily removed by washing with detergents. The second layer is physical interaction, consisting of a highly organised arrangement of soil.
c. The chemical layer-A layer of chemical reaction products formed on the metal surface with reactive atmospheric gases such as oxygen, water, hydrogen, SOx, etc. The chemical layer adheres tenaciously to the metal. It involves strong chemical attachment and strong chemisorption of soil matter on the primary surface. The chemical layer of soil is resistant to removal by rain, detergent washing, or abrasive scrubbing.

Acids and alkalis perform a wide variety of unique cleaning functions in both industrial and domestic settings. Some of these applications extend to the cleaning of condensers and evaporators in the HVAC industry as an aid to the removal of road film and other complex inorganic and/or organic matrices which bind chemically to the metal surface. The present innovation is concerned mostly with concentrated pH-active compositions for cleaning ancillaries in Heating, Ventilation and Air Conditioning (HVAC) industry, including drains, the interior metal surfaces of evaporators, condensers and ice machines that has the ability to remove the chemical layer of soiling. It will be appreciated, however, that such compositions may also be used in removal of the loose and physical soiling layers.

Sustainability influences consumer choice in the marketplace. Consequently, there has been a commercial drive towards providing chemical cleaning products that aim to have a reduced impact on the environment. This impact has mainly been guided and forced by international legislations such as EU REACH, EU BPR and US FIFRA regarding the availability and restriction of ingredients. In the field of HVAC cleaning products, the industry's contribution to enhanced sustainability has been to comply with these international legislations and reformulate the traditional dilute, ready-to-use liquid detergents as concentrated liquids. However, these formulations nevertheless still typically contain as much as 80% water by weight. Shipping these bulky masses presents transportation and logistics inefficiencies.

Existing gelled cleaning compositions have an alkaline pH, typically in the range of around 9 to 12. Such compositions rely on the swelling power of solvents like water and their high weight percentage in these compositions, up to 80% w/w, to hydrate a polysaccharide gelling agent. This is to reduce the incidence of a nucleophilic attack of the glycosidic linkages and maintain a high cross-linking ratio to surfactant concentration in these formulations. Intrinsically, the stability of these compositions is largely dependent of the weight percentage of the solvent media. This dependency compromises the desired compactness of the composition as well as the cleaning power generated when diluted. As such, existing gelled compositions only have the ability to clean the physical layer of dirt on the heat exchange systems. To reduce the chemical products' environmental footprints further, powdered detergents have been introduced within the HVAC industry. Powdered detergents are commercially attractive in terms of transportation for their compactness. However, powdered detergents present problems in terms of requiring storage in dry conditions, the need to ensure good and rapid solubility and the risk of dust exposure for both manufacturer and user. Powders have the potential to block nozzles of sprayer applicators and/or leave powder residues over surfaces if not fully dissolved, which then necessitates extra rinse cycles with more water. Warm water is often required for some powders to dissolve fully, and that creates additional inefficiencies in terms of energy demand.

Accordingly, it would be desirable to combine both the good solubility and the cleaning power of liquid detergent with the compactness of powdered detergents. Compact liquid detergents have been proposed, having increased surfactant concentrations and reduced solvent. The resulting product may derive rheological features from the reduction of the aqueous component, but phase stability and cleaning power is usually compromised.

It is with these problems in mind that the present invention has been derived. The present invention seeks to provide a stabilised, dilutable cleaning composition in a concentrated, aqueous gel form. In its broadest sense, the present invention provides a stabilised, dilutable, acid cleaning composition as a concentrated gel. Acidic cleaners, especially those with a $pKa_1$ of 4 or less, offer the ability to react down to the chemical layer, and remove all three layers of dirt, significantly increasing the efficiency of the systems. When diluted, compositions of the present invention are able to clean via four main routes: a) the neutralisation of alkaline reaction products that anchor dirt to the metal surface, b) the emulsification of oily and greasy soils, c) the suspension of removed soil, and d) reduction in redeposition of soil.

Accordingly, the present invention provides an acidic cleaning composition concentrate comprising: i) at least one acid having a $pKa_1$ of 4 or less, wherein the at least one acid is at least one organic acid and/or non-oxidising mineral acid; ii) a rheology modifier; and iii) a polar protic solvent.

In certain compositions, the at least one acid is at least one acid selected from the group consisting of hydrochloric acid, phosphoric acid, methanoic acid, hydrofluoric acid, lactic acid, oxalic acid, malic acid, sulfamic acid, tartaric acid, gluconic acid and citric acid or salts thereof or is at least one acidic salt, optionally urea hydrochloride.

Preferably, the at least one acid is present in an amount of 35 to 75 wt. %, more preferably 45 to 60 wt. %.

In certain embodiments, the composition has an acid molarity based on the total amount of the at least one acid of 5M to 20M, preferably 10M to 15M, at 25° C.

In some embodiments, the rheology modifier is present in an amount of 5 to 15 wt. %.

Preferably, the rheology modifier is a polyurethane or polyacrylate copolymer.

Preferably, the composition has a Brookfield viscosity in the range of 1000 mPa·s to 9999 mPa·s In certain embodiments, the composition further comprises a buffer.

In some examples, the polar protic solvent is water or comprises a glycol ether and an organic co-solvent.

In some examples, the composition further comprises at least one weak nitrogenous base and/or at least one carboxylate salt.

Advantageously, the carboxylate salt comprises the trisodium salt of citric acid.

Optionally, the weak nitrogenous base is at least one base selected from urea, triethanolamine, diethanolamine, pyridine, ammonia and aniline.

Advantageously, the weak nitrogenous base is present in an amount of 2 to 10 wt. %, preferably 3 to 6 wt. %.

In certain embodiments, the composition further comprises at least one surfactant.

Suitably, the at least one surfactant is at least one amphoteric, anionic or cationic surfactant.

Preferably, the at least one surfactant is present in an amount of 5 wt. % or less, optionally 4 wt. % or less.

Preferably, the at least one surfactant is selected from sodium salts of C10-C13 alkyl derivatives of benzenesulfonic acid, Amphoterge K 2N [68411-57-4] and salt-free, coco-substituted imidazoline surfactants.

Advantageously, the at least one surfactant is a biocidally-active surfactant, optionally didecyldimethylammonium chloride.

The above and other aspects of the present invention will now be described in further detail, by way of example only, with reference to the following examples.

CAS registry numbers are given to assist the reader in sourcing the components used in the following examples. However, the quotation of a CAS registry number is not to be taken as defining an essential component of the compositions of the present invention or as being in any way limiting on the scope of protection as defined by the claims. All percentages or parts are given by weight unless otherwise stated or unless the context indicates.

Example 1—Acid Ice Machine Cleaner Concentrate 50 wt % aqueous solution Citric acid (25 g) was added to a 75 wt % aqueous solution of phosphoric acid (63 g) with stirring. Di(propylene glycol) methyl ether (2 g) was added with stirring until an even mixture was obtained.

Rheosolve T450 (10 g) was added, with stirring until a homogeneous mixture was obtained. The concentrate had a pH of 1 to 2 with a Brookfield viscosity (at 100 rpm, 25° C.) of about 3000 mPa·s.

Dilution with water at a rate of up to 32:1 (parts by volume) gave a highly effective cleaner for ice-making machines. The cleaner is safe for the nickel and stainless-steel surfaces typically found in ice machines, and performed well at dissolving limescale, water spots and grease.

Example 2—Ice Machine Cleaner Concentrate

The composition of the ice machine cleaner concentrate of Example 6 was modified to the following proportions:

| | |
|---|---|
| Citric acid (50% solution in water) | 22 wt. % |
| Phosphoric acid (75% solution in water) | 63 wt. % |
| Di(propylene glycol) methyl ether | 2 wt. % |
| Rheosolve T450 | 13 wt. % |

to give a concentrate having a Brookfield viscosity (at 100 rpm, 25° C.) of about 4000 mPa·s.

Example 3—HVAC Condenser Cleaner Concentrate

Prilled Urea [CAS: 57-13-6] (5 g) was added to a mixture of 37% hydrochloric acid [7647-01-0] (18 g) and 75% phosphoric acid [7664-38-2] (60 g) with stirring and heating at 30° C. until the urea had fully dissolved. Di(propylene glycol) methyl ether [34590-94-8] (4 g), Amphoterge K 2N [68411-57-4], a salt-free, coco-substituted imidazoline amphoteric surfactant available from Lonza Group Ltd, (2 g) were added, without applying heating and with reduced stirring, to avoid excessive foaming. Rheosolve T450 (11 g), an acid-compatible, water soluble, non-ionic polyurethane rheology modifier, available from Coatex Arkema Group, was added to the mixture, with stirring to form a homogenous mixture.

The example provided a moderate to low foaming, dilutable cleaner concentrate having a pH of 1. Dilution with water at a rate of up to 32:1 (parts by volume) produced a highly effective cleaner for removing limescale, road film, rust and mild organic residues, from surfaces of a HVAC condenser, including for cleaning the coils of the unit.

Example 4—HVAC Condenser Cleaner Concentrate

In a modification of Example 3, the composition was varied to provide a composition having the following formulation:

| | |
|---|---|
| Urea | 3 wt. % |
| Hydrochloric acid (16%) | 18 wt. % |
| Phosphoric acid (75% solution in water) | 58 wt. % |
| Di(propylene glycol) methyl ether | 2 wt. % |
| Amphoterge K 2N | 4 wt. % |
| Rheosolve T450 | 15 wt. % |

In this example, the phosphoric acid solution was added with the di(propylene glycol) methyl ether and Amphoterge K 2N, rather than being pre-mixed with the hydrochloric acid. This gave a concentrate having a Brookfield viscosity (at 100 rpm, 25° C.) of about 4000 mPa·s.

Example 5—HVAC Evaporator Cleaner and Disinfectant Concentrate

To a solution of 50 wt % citric acid (20 g) and 75 wt % aqueous solution of phosphoric acid (60 g), prilled Urea [CAS: 57-13-6] (6 g) a was added with stirring until a clear solution was formed. Acticide DDQ80 [7173-51-5], an 80% solution of di-n-decyldimethylammoniumchloride (3 g), available from Thor Group, was added, with stirring, whilst avoiding excessive foaming. Rheosolve T450 (11 g) was added with further stirring until a homogenous mixture was obtained having a pH of 2, with a Brookfield viscosity (at 100 rpm, 25° C.) of about 4000 mPa·s.

The concentrate was diluted with water at a rate of 16:1 (parts by volume) to give a biocidal cleaning composition for removing organic residues and scale on HVAC evaporators.

Example 6—HVAC Evaporator Cleaner and Disinfectant Concentrate

In a variation of Example 5, ethanolamine was included instead of urea, with the Acticide DDQ80 addition. The proportions of the components were adjusted as follows:

| | |
|---|---|
| Citric acid (50% solution in water) | 17 wt. % |
| Ethanolamine | 6 wt. % |
| Phosphoric acid (75% solution in water) | 64 wt. % |
| Acticide DDQ80 | 2 wt. % |
| Rheosolve T450 | 11 wt. % |

Example 7—Universal Cleaner Concentrate

Trisodium sodium citrate (6 g) and citric acid (29.5 g) were mixed and a 75 wt % aqueous solution of phosphoric acid (50 g) was added, with stirring and heating at 30° C. until a clear solution was formed. Di(propylene glycol) methyl ether (2 g), Surco 30S (0.5 g) and ethanolamine (1 g) were added, with stirring at a reduced speed to avoid excessive foaming. Rheosolve T450 (11 g) was added with stirring until a homogenous mixture, having a pH of 3, was obtained, with a Brookfield viscosity (at 100 rpm, 25° C.) of about 4000 mPa·s.

| | |
|---|---|
| Citric acid (50% solution in water) | 29.5 wt. % |
| Trisodium Citrate | 6 wt. % |
| Phosphoric acid (75% solution in water) | 50 wt. % |
| Di (propylene glycol) methyl ether | 2 wt. % |
| Surco 30s | 0.5 wt. % |
| Ethanolamine | 1 wt. % |
| Rheosolve T450 | 11 wt. % |

Example 8—Drain Cleaner Concentrate

Hydrochloric acid (48.5 g, 16%) was added to urea (12.5 g) with stirring until dissolved. Citric acid [77-92-9] (26 g) was added with continued stirring, followed immediately by the addition of ethanolamine [141-43-5] (3 g). Stirring was continued until the solution was evenly mixed. Rheosolve T450 (10 g) was added to the mixture, with stirring to form a homogenous, having a pH of about 2.

| | |
|---|---|
| Hydrochloric acid (16%) | 48.5 wt. % |
| Urea | 12.5 wt. % |
| Citric acid (50% solution in water) | 26 wt. % |
| Ethanolamine | 3 wt. % |
| Rheosolve T450 | 10 wt. % |

The viscosity was observed to increase over two days before decreasing, forming a viscously stable composition after seven days to a Brookfield viscosity (at 100 rpm, 25° C.) of about 3400 mPa·s.

The example provided a concentrate which, when diluted with water at a rate of up to 16:1 (parts by volume) gave a drain cleaner composition having excellent properties for dissolving slime, grime, limescale, fats and grease in drains.

Example 9—Drain Cleaner Concentrate

In a variation of Example 8, sulphamic acid was included instead of citric acid addition. The proportions of the components were adjusted as follows:

| | |
|---|---|
| Hydrochloric acid (16%) | 48.5 wt. % |
| Urea | 12.5 wt. % |
| Sulphamic acid | 26 wt. % |
| Ethanolamine | 3 wt. % |
| Rheosolve T450 | 10 wt. % |

Further example compositions were prepared using Rewoteric AM TEG, a tallow betaine gelling agent in place of Rheosolve T450, following the same procedures as set out above. A source of chloride ions was added, as hydrochloric acid or sodium chloride, to increase cross-linking.

Example 10—Ice Machine Cleaner Concentrate

| | |
|---|---|
| Citric acid (50% solution in water) | 27 wt. % |
| Phosphoric acid (75% solution in water) | 63 wt. % |
| Di(propylene glycol) methyl ether | 2 wt. % |
| Sodium Chloride | 3 wt. % |
| Rewoteric AM TEG | 5 wt. % |

This mixture gave a concentrate having a Brookfield viscosity (at 100 rpm, 25° C.) of about 3900 mPa·s.

Example 11—HVAC Condenser Cleaner Concentrate

| | |
|---|---|
| Urea | 8 wt. % |
| Hydrochloric acid (16%) | 18 wt. % |
| Phosphoric acid (75% solution in water) | 58 wt. % |
| Di(propylene glycol) methyl ether | 2 wt. % |
| Amphoterge K 2N | 4 wt. % |
| Rewoteric AM TEG | 10 wt. % |

This mixture gave a concentrate having a Brookfield viscosity (at 100 rpm, 25° C.) of about 4000 mPa·s.

Example 12—HVAC Evaporator Cleaner and Disinfectant Concentrate

| | |
|---|---|
| Citric acid (50% solution in water) | 12 wt. % |
| Ethanolamine | 6 wt. % |
| Phosphoric acid (75% solution in water) | 64 wt. % |
| Acticide DDQ80 | 2 wt. % |
| Sodium Chloride | 5 wt. % |
| Rewoteric AM TEG | 11 wt. % |

This mixture gave a concentrate having a Brookfield viscosity (at 100 rpm, 25° C.) of about 3800 mPa·s.

Example 13—Universal Cleaner Concentrate

| | |
|---|---|
| Citric acid (50% solution in water) | 29.5 wt. % |
| Trisodium Citrate | 6 wt. % |
| Phosphoric acid (75% solution in water) | 45 wt. % |
| Di (propylene glycol) methyl ether | 2 wt. % |
| Surco 30s | 0.5 wt. % |
| Ethanolamine | 1 wt. % |
| Sodium Chloride | 5 wt. % |
| Rewoteric AM TEG | 11 wt. % |

This mixture gave a concentrate having a Brookfield viscosity (at 100 rpm, 25° C.) of about 3800 mPa·s.

Example 14—Drain Cleaner Concentrate

| | |
|---|---|
| Hydrochloric acid (16%) | 48.5 wt. % |
| Urea | 12.5 wt. % |
| Citric acid (50% solution in water) | 26 wt. % |
| Ethanolamine | 3 wt. % |
| Rewoteric AM TEG | 10 wt. % |

This mixture gave a concentrate having a Brookfield viscosity (at 100 rpm, 25° C.) of about 4000 mPa·s.

SUMMARY

The above compositions were all determined to exhibit excellent dilutability, and excellent cleaning properties for the indicated function. The composition of claim 1 provides an excellent base composition which can be modified to suit specific purposes. By way of example, the base composition can be used without modification for, for example, an ice machine cleaner. A condenser cleaner advantageously additionally includes at least one surfactant and a general purpose cleaning composition such as that of Example 7, advantageously includes a carboxylate salt.

The present invention provides stabilised, dilutable acidic cleaning compositions in a concentrated, aqueous gel form. As with powdered formulations, dilutable gel detergents are easier to transport in bulk than existing compositions, require less packaging material, and occupy less space on the store shelf. They additionally offer the excellent chemical dexterity of dilute liquid detergents, compared with powdered detergent concentrate compositions. When diluted, the range of products of the present invention are able to clean via four main conventional routes: a) neutralisation of acidic or alkaline soils, b) emulsification of oil and grease, c) suspension of removed soiling, and d) prevention of its redeposition.

Although indicated above as having specific purposes within the HVAC industry, it will be appreciated that each inventive composition is equally suitable for other purposes, both within the HVAC industry and elsewhere.

We have found that the inventive concentrates, following dilution, retain a sufficient gelatinousness to coat metallic surfaces, making the compositions ideal for cleaning difficultly positioned surfaces, such as those of vertically-installed condensers.

The invention claimed is:

1. A gelled acidic cleaning composition for use in heating, ventilation and air-conditioning (HVAC) installations, the composition comprising:

i) at least one acid having a $pKa_1$ of 4 or less, wherein the at least one acid is at least one of an organic acid and a non-oxidising mineral acid;

ii) a rheology modifier that is a polyurethane or polyacrylate copolymer; and iii) a polar protic solvent;

wherein the at least one acid is present in an amount of 35 to 75 wt. % and the rheology modifier is present in an amount of 5 to 20 wt. %, based on the total weight of the composition, and wherein the composition has an acid molarity based on the total amount of the at least one acid of 5M to 15M at 25° C.

2. The composition as claimed in claim 1, wherein the at least one acid is (a) selected from the group consisting of hydrochloric acid, phosphoric acid, methanoic acid, hydrofluoric acid, lactic acid, oxalic acid, malic acid, sulfamic acid, tartaric acid, gluconic acid citric acid, and one or more salts thereof, or (b) at least one acidic salt.

3. The composition as claimed in claim 1, wherein the at least one acid is present in an amount of 40 to 70 wt. % based on the total weight of the composition.

4. The composition as claimed in claim 1, wherein the composition has an acid molarity based on the total amount of the at least one acid of 10 M to 15 M at 25° C.

5. The composition as claimed in claim 1, wherein the rheology modifier is present in an amount of 5 to 15 wt. % based on the total weight of the composition.

6. The composition as claimed claim 1, wherein the composition has a Brookfield viscosity in the range of 1,000 mPa·s to 9,999 mPa·s.

7. The composition as claimed in claim 1, further comprising a buffer.

8. The composition as claimed in claim 1, wherein the polar protic solvent is water.

9. The composition as claimed in claim 1, further comprising at least one of a nitrogenous base and a carboxylate salt.

10. The composition as claimed in claim 9, wherein the carboxylate salt comprises trisodium salt of citric acid.

11. The composition as claimed in claim 9, wherein the nitrogenous base is at least one base selected from the group consisting of urea, triethanolamine, diethanolamine, pyridine, ammonia and aniline.

12. The composition as claimed in claim 11, wherein the nitrogenous base is present in an amount of 2 to 10 wt. % based on the total weight of the composition.

13. The composition as claimed in claim 1, further comprising at least one surfactant.

14. The composition as claimed in claim 13, wherein the surfactant is at least one amphoteric, anionic or cationic surfactant.

15. The composition as claimed in claim 13, wherein the surfactant is present in an amount of 5 wt. % or less based on the total weight of the composition.

16. The composition as claimed in claim 13, wherein the surfactant is selected from the groups consisting of sodium salts of $C_{10}$-$C_{13}$ alkyl derivatives of benzenesulfonic acid and salt-free, coco-substituted imidazoline surfactants.

17. The composition as claimed in claim 13, wherein the surfactant is a biocidally-active surfactant.

* * * * *